United States Patent [19]
Nishimura et al.

[11] Patent Number: 5,411,430
[45] Date of Patent: May 2, 1995

[54] SCANNING OPTICAL DEVICE AND METHOD FOR MAKING A HYBRID SCANNING LENS USED THEREFOR

[75] Inventors: Takashi Nishimura, Hachioji; Akira Arimoto, Kodaira; Yoshinori Miyamura, Tokyo; Yumiko Anzai, Tachikawa; Yoshimasa Kondo, Koganei; Fumihiko Uchida, Hachioji; Shigeo Moriyama, Tama, all of Japan

[73] Assignees: Hitachi Ltd.; Hitachi Koki Co., Ltd., both of Tokyo, Japan

[21] Appl. No.: 950,687

[22] Filed: Sep. 25, 1992

[30] Foreign Application Priority Data

Sep. 25, 1991 [JP] Japan .................. 3-245498
Dec. 9, 1991 [JP] Japan .................. 3-324225
Jul. 8, 1992 [JP] Japan .................. 4-180725

[51] Int. Cl.⁶ ............................ B24B 49/00
[52] U.S. Cl. ........................ 451/1; 451/5; 451/11; 451/27; 451/42; 451/211; 451/256
[58] Field of Search ............ 51/96, 97 C, 99, 100 R, 51/101 R, 101 LG, 105 R, 109 R, 124 L, 126, 164.71, 164.77, 164.93, 281 R, 284 R

[56] References Cited
U.S. PATENT DOCUMENTS

| | | | |
|---|---|---|---|
| 2,915,856 | 12/1959 | Cretin-Maitenaz | 51/124 L |
| 3,902,277 | 9/1975 | Rupp | 51/96 |
| 4,264,249 | 4/1981 | Dawson | 51/124 L |
| 4,751,796 | 6/1988 | Ueda et al. | 51/267 |
| 5,107,628 | 4/1992 | Kondo et al. | 51/124 L |
| 5,154,020 | 10/1992 | Kajima | 51/124 L |

FOREIGN PATENT DOCUMENTS

| | | |
|---|---|---|
| 55-28023 | 2/1980 | Japan . |
| 56-25701 | 3/1981 | Japan . |
| 59-204001 | 11/1984 | Japan . |
| 223313 | 1/1990 | Japan . |
| 253557 | 2/1990 | Japan . |

*Primary Examiner*—Maurina T. Rachuba
*Attorney, Agent, or Firm*—Antonelli, Terry, Stout & Kraus

[57] ABSTRACT

The present invention provides a hybrid lens having an axially asymmetrical non-spherical shape, good mass productivity, and excellent shape precision surface precision as well as environment resistant property, and a method for fabricating same, as well as a method and a device for a laser printer using that hybrid lens. In particular, there are disclosed a method, by which, when an axially asymmetrical non-spherical convex lens is formed by the replica method, the shape thereof is transcribed with a high precision, as well as a method and a device for fabricating an axially asymmetrical non-spherical concave lens (female die) serving as an original for the transcription. In a device for fabricating a female die by direct grinding, the positions of a rotation axis of an object to be worked and a rotation axis of a grinding wheel are controlled and it has further a function of correcting mounting errors, when the object to be worked and the grinding wheel are mounted.

10 Claims, 14 Drawing Sheets

SCANNING OPTICAL DEVICE AND METHOD FOR MAKING A HYBRID SCANNING LENS USED THEREFOR

BACKGROUND OF THE INVENTION

The present invention relates to an axially asymmetrical non-spherical F$\theta$ lens having a complicated shape and to a method for making same, as well as to a laser beam printer using that lens.

At first, the construction of a laser printer will be explained, referring to drawings. A laser beam printer consists mainly of a scanning optical system (FIG. 21), which modulates and deflects a laser light beam emitted by a light source 39 so as to form a light pattern on a light sensitive body 43 and an image forming system (FIG. 22), which transforms the light pattern formed on the light sensitive body 43 by the scanning optical system into a hard copy by using an electronic photographic process.

In FIG. 21, generally a gas laser or a semiconductor laser is used for the light source 39. Further, generally an A/O modulator using an acoustic optical (A/O) element is used for the modulator 47. The A/O modulator intensity-modulates an injected laser light beam by diffracting it by synchronous variations in the refractive index generated by an ultrasonic wave, which is made to pass through the A/O element. In order to increase modulation speed by the A/O element, a beam compressor 48a for decreasing the diameter of the injected beam, a beam expander 48b used for obtaining a small image spot on the light sensitive body, and a collimator lens 41 for transforming a diverging beam emitted by the semiconductor laser into a parallel beam are used. Further a rotary polygonal mirror 42 is used for the deflector for scanning the light sensitive body with the laser light beam. In addition, a laser printer using a hologram instead of the rotary polygonal mirror is also proposed.

Since the rotary polygonal mirror 42 is rotated with a constant speed, the reflected laser light beam is deflected with a constant angular velocity. An imaging lens (F$\theta$) 38 has a function (f$\theta$ characteristics) of giving the injected light beam deflected with a constant angular velocity optical distortion for transforming the beam so as to scan the surface of the light sensitive body with a constant speed.

The light sensitive body 43 has a two-layered structure in which a photoconductive layer is disposed on a conductive supporter. The surface of the light sensitive body is previously uniformly charged in the dark by discharge of plus corona 49, etc. (FIG. 22) When this is irradiated with laser light, the resistance of the photoconductor decreases at the part irradiated with light so that electric charge existing there flows to ground, which gives rise to parts where electric charge still exists and parts where there exists no more electric charge on the surface of the light sensitive body 43.

A latent image formed on the light sensitive body 43 is developed by toner charged positively or negatively. As indicated in FIG. 22, the electric charge on the surface of the insulating layer of the light sensitive body 43 is removed by corona discharge 50 and at the same time it is irradiated with laser light through the imaging lens 38. At clear parts irradiated with laser light the resistance of the photoconductive layer decreases so that it becomes conductive and thus electric charge on the front and the rear surface of the insulating layer decreases rapidly. At dark parts, which are not irradiated with laser light, although the surface of the insulating layer is exposed to AC corona discharge 50 and the potential thereof becomes approximately zero, the electric charge formed at the interface between the insulating layer and the photoconductive layer is held.

As described above, after a charged layer has been formed by the primary charging at the interface between the insulating layer and the photoconductive layer, the electric charge on the surface of the insulating layer is removed by the corona charge elimination, and at the same time it is exposed by irradiating it with laser light. Thereafter the whole surface of the light sensitive body 43 is exposed uniformly by a whole surface exposer 51 so that the superficial potential at the dark parts is raised. The latent image formed on the light sensitive body 43 is developed by using toner charged positively or negatively in a developing device 52. After a developing step, the toner image thus obtained on the light sensitive body 43 is transcribed electrostatically on a plain paper sheet sent from a sheet supplying cassette 53 through a sheet supplying roller 54 and transformed into a stable permanent image by a fixing step by means of a fixing device 55. The plain paper sheet, on which the image is transcribed, is sent to a stacker 56. After the transcribing step, toner remaining on the light sensitive body, which has not been transcribed, is removed by a cleaning step by means of a cleaner 57 and a cleaning blade 58. In this way the light sensitive body 57 is prepared for a succeeding latent image forming process. The laser beam printer is described e.g. in "Laser Beam Printer" (Shashin Kogyo or Photography Industry) by Kitamura and Hirayama, February 1976, pp. 89-92.

For such a laser printer following propositions have been done in order to achieve printing of high quality without increasing the number of parts.

For example, in JP-A-2-23313, a construction is disclosed, for which the F$\theta$ lens has an asymmetrical non-spherical shape, in which the radius of curvature in the direction of tilt of facets (in the auxiliary scanning direction) thereof increases with increasing distance from the optical axis.

Another method for fabricating such an asymmetrical non-spherical lens is disclosed in JP-A-2-533557. This is a method, by which the lens is fabricated by grinding under NC control. By this method it is possible to generate an arbitrary non-spherical shape. However, by this method, a long working time is necessary (7 pieces for 3 hours) and therefore there was a problem in the mass productivity.

Still another method has been proposed as a method of fabricating a non-spherical lens, which is excellent in the mass productivity, by which a plastic lens excellent in the shape precision and the surface precision is obtained in addition to the molding method using a plastic substance as raw material. (refer to e.g. JP-A-59-204001)

However, concerning a female die necessary for molding processing, almost all the optical surfaces available at present are plane or spherical. Further, even if they are non-spherical, they are axially symmetrical non-spherical surfaces such as those used in a single lens reflex camera and it is not possible to fabricate axially asymmetrical non-spherical concave surfaces. That is, although it is possible to fabricate symmetrical non-spherical surfaces by molding processing, at the present state it is not possible to fabricate axially asymmetrical non-spherical surfaces in mass production by molding processing. Furthermore, in plastic lenses, deformations are easily produced by variations in the temperature at use, which can cause aberrations and deviations in the optical axis. Still further the plastic lenses are apt to be influenced by humidity and chemical substances in the atmosphere. In order to solve this point, there are proposed a method for forming a protecting film on the lens surface (e.g. JP-A-55-28023) and a lens protecting film forming method, by which an organic silicon protecting film is formed by evaporation (e.g. JP-A-56-25701). However, by these methods, since it is difficult to control the protecting film thickness and a process of baking the evaporated film is necessary, it is not possible to fabricate axially asymmetrical non-spherical lenses of high quality and mass-productivity. Therefore it is an important problem to be solved to develop a technique for generating a concave surface having an axially asymmetrical non-spherical shape to obtain an axially asymmetrical non-spherical female die with a high precision.

SUMMARY OF THE INVENTION

Therefore an object of the present invention is to solve these problems of the prior art techniques and to provide a hybrid lens having an axially asymmetrical non-spherical shape having a good mass-productivity, excellent in the precision of the shape, the precision of the surface and the environment-resistant property and a method for fabricating same as well as a laser beam printer using the hybrid lens.

Another object of the present invention is to provide a hybrid lens, using an axially asymmetrical non-spherical concave surface.

Still another object of the present invention is to fabricate an axially asymmetrical non-spherical concave surface with a high precision to provide an axially asymmetrical non-spherical female die with a high precision and a method for making same.

In order to achieve the above objects, according to an aspect of the present invention, resin made of a transparent organic macromolecule substance having a refractive index almost identical to that of a basic lens is superposed in an axially asymmetrical non-spherical shape on a surface of the basic glass lens having extremely small unevenness over the whole lens surface or a part thereof to fabricate a scanning lens, in which the basic glass lens and the resin have a one-body junction structure. Further, a resin hardened by ultraviolet ray is used for the transparent organic macromolecule substance having the refractive index almost identical to that of the basic glass lens and superposed thereon to constitute the hybrid lens. The lens formed by superposing the ultraviolet hardened resin is characterised by a non-spherical surface, in which the radii are different for the main axis and for the auxiliary axis and the radius of curvature of the auxiliary axis increases asymmetrically with increasing distance from the optical axis. Further a desired lens shape is transferred on the surface of the basic glass lens by the shape transferring process. The female die used for the shape transferring process has an axially asymmetrical non-spherical shape. The present invention is characterised in that the plastic lens part made of ultraviolet hardened resin and the basic glass lens part are jointed in one body. Further a protecting film made of SiO or $SiO_2$ is formed on the lens surface by a thin film forming method such as the vacuum evaporation method, etc.

Further, in the fabrication of the female die, the spatial positional relation between an object to be worked and a grinding wheel spindle is controlled with a high speed in a polar coordinate system. The object to be worked is rotated and the grinding wheel spindle is moved along an arc in a plane perpendicular to the direction of rotation thereof. The method according to the present invention is characterised in that a desired non-spherical female die is fabricated by varying the interaxial distance between the rotational axis of the object to be worked and the rotational axis around which the grinding wheel spindle is moved along an arc, depending on the angle of rotation of the object to be worked.

In addition, superficial roughness of the surface finished by grinding is improved and thus a non-spherical female die can be obtained with a high precision by controlling the amount of projected grinding fluid and the direction of the projection, depending on movement of a grinding point accompanied by the movement of the grinding wheel spindle along an arc.

According to an embodiment of the present invention, a hybrid lens is fabricated by superposing resin having a refractive index approximately identical to that of a basic lens made of glass thereon and by forming them in a one-body junction. Since the resin having a refractive index approximately identical to that of glass is superposed thereon, no variations in the optical path at the junction interface take place. Since it is possible to fabricate in mass production such hybrid lenses having an axially asymmetrical non-spherical shape for correcting fluctuations in the scanning pitch due to inclination of reflecting surfaces of the rotary polygonal mirror in the laser beam printer, it is possible to realize easily cheap laser beam printers with an extremely high precision. In order to obtain a hybrid lens having an axially asymmetrical non-spherical shape, according to the present invention, a female die is used, which has an axially asymmetrical non-spherical concave surface. By using this female die, synthetic resin is superposed on a basic lens made of glass and at the same time the asymmetrical non-spherical concave shape of the female die is transcribed by the replica method. Since an ultraviolet hardened resin is used for the synthetic resin and it is formed by the replica method, a non-spherical $F\theta$ lens for the laser beam printer having a complicated shape can be extremely easily fabricated by using a female die of high precision.

Further, even if the finished state of the basic lens is bad and the surface thereof is no mirror-polished surface, since the transcribing surface of the female die is finished in an almost mirror-polished state, the surface of the obtained hybrid lens is a mirror surface. In addition, since the refractive index of the resin superposed on the basic lens and formed together therewith is almost identical to that of the basic lens, it is possible to obtain a completed hybrid lens having optical characteristics completely identical to those obtained for a glass lens.

In order to improve the junction property between the basic lens and the resin layer superposed thereon, extremely small unevenness is formed on the surface of the basic lens. In this way it is possible to improve the junction property between the basic lens and the resin layer superposed thereon without impairing optical characteristics of the lens by superposing the resin layer thereon and forming it together therewith.

In the hybrid lens according to the present invention, a thin film having an axially asymmetrical non-spherical shape made of synthetic resin is superposed on the surface of the basic lens made of glass. The plastic lens part made of synthetic resin is very thin so that the average film thickness is smaller than 20 $\mu$m. Since an ultraviolet hardened resin is used for the plastic material and the plastic lens is formed on the glass lens by irradiating it with ultraviolet ray, it is not necessary to apply any high pressure to the resin at the lens formation. Consequently, compared with the case where the axially asymmetrical non-spherical lens is fabricated by the molding process using only plastic raw material, it is possible to suppress remaining stress generated in the plastic lens after the formation to a small value. Therefore it does almost not happen that remaining stress gives rise to deformations or deteriorations in optical characteristics thereof.

Further, since a protecting film made of SiO or $SiO_2$ is formed on the surface of the lens, reliability including the climate-resistant property and the water-proofing property of the hybrid lens can be improved. When the protecting film made of SiO or $SiO_2$ is formed on the surface of the lens by the vacuum evaporation method, the lens is exposed to vacuum. If water exists within the plastic lens layer, since water is released from the interior of the lens during the formation of the protecting film and it sticks to the surface of the lens, it is feared that adhesiveness between the protecting film and the surface of the lens is lowered. Therefore, in order to increase the adhesiveness between the protecting film and the surface of the lens, the following measure is taken. At first, in order to eliminate water existing in the interior of the lens, the hybrid lens thus formed and hardened is subjected to thermal treatment for a certain period of time. When the water existing in the interior of the lens is completely removed, dirt stuck to the surface of the lens is removed by subjecting it to cleaning treatment while blowing ozone against the surface of the lens. In this way the adhesiveness between the protecting film and the surface of the lens is improved and the protecting film is formed on the surface of the lens. Since the protecting film having a small superficial energy, which is so dense that no water molecules can pass therethrough, exists on the surface of the lens fabricated by the method described above, the water rejecting property is improved and water never penetrates from the exterior into the interior of the lens. Thus it is possible to realize a lens excellent in reliability.

Further the resin can be hardened uniformly by subjecting the hybrid lens thus formed and hardened to thermal treatment. In this way a hybrid lens which is homogeneous over the whole area can be obtained.

By the method for fabricating the female die described above, grinding is effected while varying the interaxial distance between the axis of rotation of the object to be worked and the axis of rotation for the movement of the grinding wheel along an arc, depending on the rotational angle of the object to be worked. Further, if the grinding wheel is slightly moved unit step by unit step and grinding is continued while updating data for work every time, it is possible to fabricate a modified toric shape having slight deviations from a toric shape. In a grinding device for generating a female die 59 as indicated in FIG. 23, a grinding wheel 15 grinds the object to be worked while moving along a trajectory 300 on a curved surface to be generated around it. At this time it is desirable to dispose a nozzle 60 at the grinding point parallelly to the tangent to the grinding wheel to eject grinding fluid therethrough. However, since in reality the nozzle and the object to be worked interfere with each other or there exists an air layer on the surface of the grinding wheel rotating with a high speed, which repels the most part of the grinding fluid, the amount of the grinding fluid reaching the grinding part decreases. Therefore, in order to prevent the interference between the nozzle and the object to be worked and to raise the efficiency of supplying grinding fluid to the grinding point, the nozzle is disposed in a direction slightly inclined with respect to the tangent to the grinding wheel, as indicated in FIG. 24. However, in such a state, when the grinding is effected while moving the grinding wheel 15 along a certain trajectory 300, the direction of ejection of the grinding fluid changes delicately, depending on the relative positional relation between the grinding wheel 15 and the object to be worked 59. This gives rise to delicate differences in the state of the supply of the grinding fluid, and therefore the state of the finished surface varies, depending on the position. In order to solve this problem, it is necessary to optimize the direction of ejection of the grinding fluid. Therefore, according to the present invention, it is possible to realize a uniformly finished surface by disposing a plurality of nozzles 35 along a trajectory in the auxiliary scanning direction, as indicated in FIG. 25, because in this way it is possible to eject the grinding fluid at the grinding point in an unvarying state, even if the relative grinding position is varied.

Furthermore, it is possible to fabricate female dies having an arbitrary shape with a high precision and a high mass productivity by fabricating the female dies by using ultraviolet hardened resin for the fabrication of the hybrid lens.

DETAILED DESCRIPTION OF THE PREFERRED EMBODIMENTS

Figure 1A:
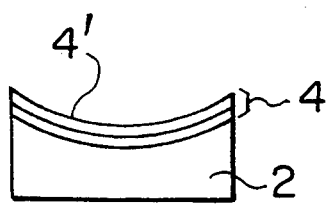
FIGS. 1a to 1d are diagrams for explaining fabrication steps of a method for fabricating an axially asymmetrical non-spheric hybrid lens according to an embodiment of the present invention.

Hereinbelow several embodiments of the present invention will be explained, referring to the drawings.

FIGS. 1a to 1d and FIGS. 2a to 2d are diagrams for explaining steps of a method for fabricating a hybrid non-spheric lens by a shape transcribing method (replica method).

Figure 2A:
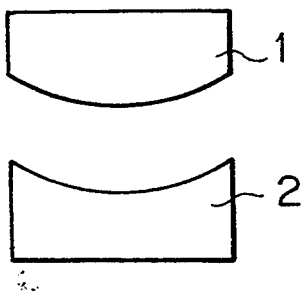
FIGS. 2a to 2d are diagrams for explaining fabrication steps of a method for fabricating an axially asymmetrical non-spheric female die according to an embodiment of the present invention.

At first, a method, by which a female die is fabricated by using an axially asymmetrical non-spherical lens (original lens) 1 as a mother, as indicated in FIG. 2a. For the axially asymmetrical non-spherical lens 1 serving as the mother, for example, that fabricated by the fabricating device described in JP-A-2-53557 may be used. It is so constructed that an ultraviolet hardened resin layer is superposed on the surface of the female die. However, since this ultraviolet hardened resin layer is extremely thin so that the film thickness is at most about several tens of micrometers, mechanical strength of the film is small. Consequently a die 2 having a toric shape opposite to the original lens 1 and having values close to radii of curvature of the latter is used as a base for the female die made of resin. It is desirable that the die 2 serving as the base is made of such a material that it is almost not deformed by heat, external force, temperature, etc. Further, since this female die is used repeatedly, a material having an excellent adhesiveness to the die 2 serving as the base is used for the resin layer 4 forming the surface. Here brass is used as the material for the die serving as the base. The surface of the die made of brass is previously treated so as to be roughened. This is done for improving the adhesiveness between the surface of the die and the resin layer 4.

For example, when emery paper No. 600 is used for the roughening treatment of the surface of the die, a surface having a roughness, which is about 3 $\mu$m at maximum, can be obtained. Since the resin layer is about 30 $\mu$m on an average, this unevenness of the surface of the die doesn't influence on the superficial roughness of the surface of the finished female die.

Next the die 2 serving as the base is cleaned satisfactorily by using organic solvent such as acetone, isopropyl alcohol, etc. Further, after having subjected the surface of the die 2 to ozone treatment with irradiation with ultraviolet ray for about 5 minutes, a surface treating agent is applied thereto in order to increase the adhesiveness to the ultraviolet hardened resin 3 and it is subjected to a thermal treatment at 80° C. for 10 minutes.

Figure 2B:
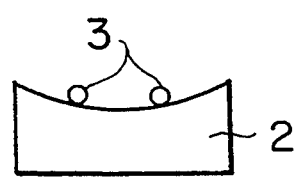

Then a suitable amount of ultraviolet hardened resin 3 is dropped on the die 2, the original lens 1 is put thereon, and the whole is subjected to a bubble eliminating treatment, as indicated in FIG. 2b.

Figure 2C:
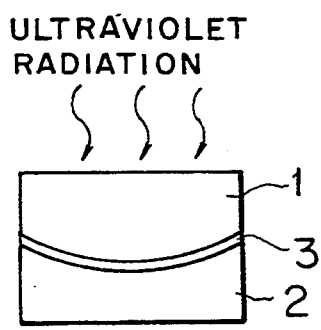

Thereafter it is irradiated with ultraviolet ray for 30 seconds, as indicated in FIG. 2c. At this time the ultraviolet hardened resin 3 is inserted between the original lens 1 and the die 2 to be in a one-layer state.

Figure 2D:
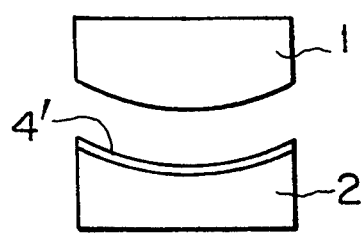

Finally the original lens 1 is separated from the surface 4' of the female die consisting of the ultraviolet hardened resin 3 and the die 2, as indicated in FIG. 2d.

Further, as indicated in FIG. 1a, in order to increase the adhesiveness to the surface 4' of the female die made of ultraviolet hardened resin, the same surface treatment as described above is repeated and resin layers 4 are superposed one after another, until any difference exists no more between the original lens 1 and the female die. That is, ultraviolet hardened resin 3 is dropped on the resin layer 4 on the die 2, the original lens 1 is put thereon, the whole is subjected to a bubble eliminating treatment and irradiated with ultraviolet ray. By repeating this process a certain number of resin layers 4 are formed. At least 2 resin layers are formed.

A resin, which has a small hardness after hardening and which can be fitted easily to the shape of the original lens 1, is used for the ultraviolet hardened resin constituting the surface of the die obtained in this embodiment. For example, STM4 (produced by Dainihon Ink Co.) or R6602 (produced by Nihon Gosei Gomu Co.) is suitable. Further it is preferable that the ultraviolet hardened resin for the hybrid lens 6 has a refractive index extremely close to that of the basic glass lens 5 serving as the base and is an environment-resistant resin.

The female die is completed by the fabrication steps as described above.

Figure 3A:
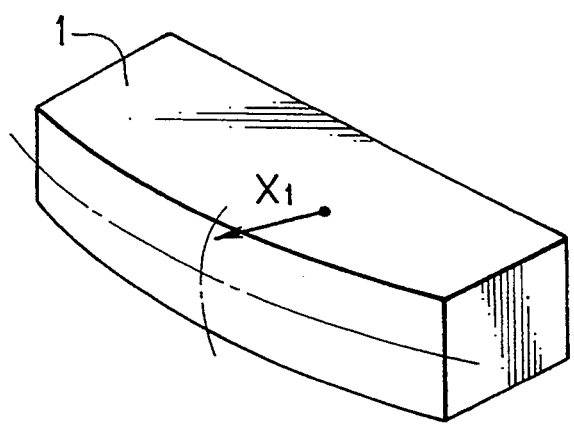
FIGS. 3a and 3b are perspective views showing the shape of a basic glass lens and a hybrid lens, respectively, having an axially asymmetrical non-spheric surface.
Figure 3B:
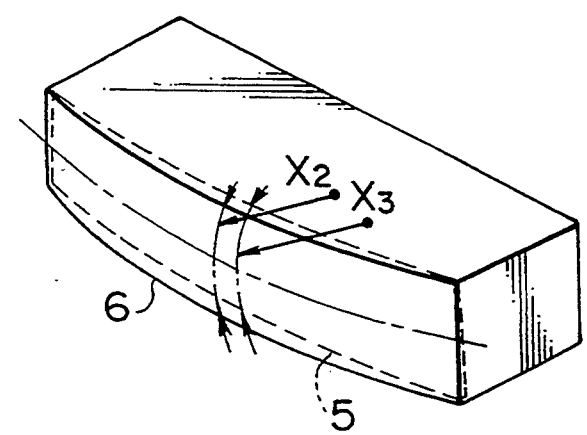

FIGS. 3A and 3B indicate results obtained by measuring the shape of the axially asymmetrical non-spherical lens 1 used as the original in the fabrication of the female die 2, the completed hybrid lens 6, and the basic lens 5 by means of a three-dimensional shape measuring apparatus. The radius of curvature $X_1$ of the original lens 1 was 45.251 mm at the center of the lens and the greatest Superficial roughness of the surface was 0.152 μm (FIG. 3a). On the other hand, the radius of curvature $X_2$ of the hybrid lens 6 fabricated according to the present invention was 45.253 mm at the center of the lens and the greatest superficial roughness was 0.139 μm. Further the radius of curvature $X_3$ of the basic lens 5 serving as the base for the hybrid lens 6 was 44.115 mm at the center of the lens and the greatest superficial roughness was 3.426 μm. In this way it was verified that a very good transcription precision can be obtained by the method for fabricating the lens according to the present invention.

Further 11 cross-hatch-shaped scratches were formed longitudinally and transversally with an interval of 1 mm on the surface of the resin layer by means of a cutter, and it was tried to tear off cross-hatch scratch parts by using an adhesive tape. No one part of the resin layer was ever torn from the basic lens. On the other hand, similar experiments were effected for a hybrid lens, in which several resin layers were superposed on the surface of a basic lens, which was very smoothly finished. In this case, among 100 pieces constructed by the longitudinal and the transversal 11 scratches formed in a cross-hatch shape, 40 pieces were torn off by an adhesive tape. In this way, it was possible to confirm the effect of the toughening treatment effected previously on the surface of the basic lens.

In the embodiment described above, the female die was fabricated by the replica method. Apart therefrom, it can be fabricated by using the same glass as the material for the lens. Now an embodiment of the method by which the female die is fabricated directly by grinding, starting from a concave-shaped glass block, and a device for realizing same will be explained.

Figure 4:
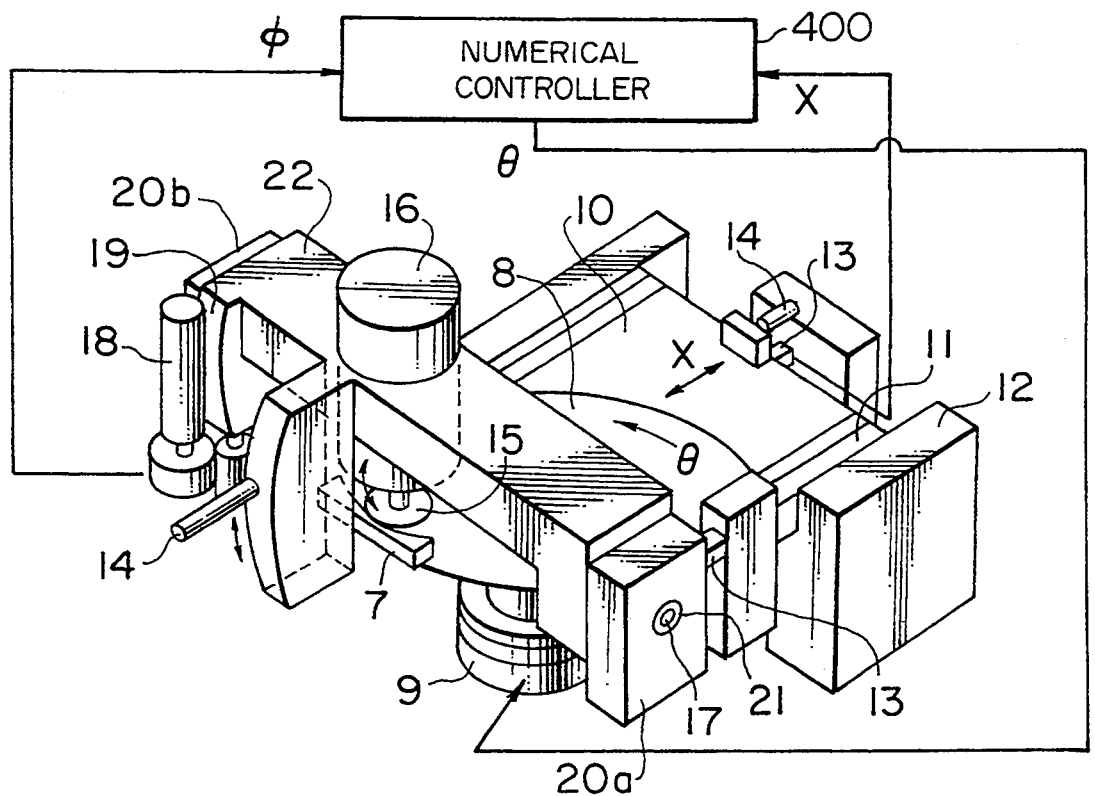
FIG. 4 is a perspective view showing the construction of a device for fabricating the axially asymmetrical non-spheric female die.

FIG. 4 indicates the construction of a working device based on the method for fabricating an axially asymmetrical non-spherical object according to the present invention. A workpiece (concave-shaped glass block, which is an object to be worked) 7 is mounted on a rotating table 8 rotated by a DC servo motor.

This rotating table 8 is supported by an angular contact ball bearing so as to be rotated with a deflection-of-rotation precision of about 0.1 μm. Further a rotary encoder 9 is directly coupled with the shaft of the rotating table 8 in order to detect the rotational angle of the rotating table 8. Still further, this rotating table 8 is mounted on a straight forwarding table 10 using a cross roller guide. This straight forwarding table 10 is mounted on a base 12 through a guide. A piezo actuator 13 is used for driving this straight forwarding table 10. In order to control numerically the straight forwarding table 10 with a precision of about 0.01 μm, an electrostatic capacitance type displacement detector 14 is used as a table position detector to effect a closed loop control.

On the other hand, a grinding wheel 15 is used for processing the workpiece. This grinding wheel 15 is mounted on an air spindle 16, in which a high frequency motor is built-in, and rotated with a rotation speed of about 30,000 rpm. Further the air spindle 16 is constructed so that it can be swung along an arc by means of a worm 18 and a worm wheel 19 around an air spindle holding shaft 17 set so as to be perpendicular to the rotational axis thereof. The two extremities of the air spindle holding shaft 17 are fixed by supporting members 20a and 20b. In order to improve the working precision for the workpiece 7, it is necessary that the rotation oscillation of a bearing 21 for the swinging movement be almost 0. For this reason, a rotating mechanism is incorporated, by which oscillation of the rotational axis is detected by the electrostatic capacitance type displacement detector 14, and it is possible to suppress the oscillation of the rotational axis to a small value by elastically deforming the supporting member 20a supporting the rolling bearing (bearing 21) by means of the piezo actuator 14.

Figure 5:
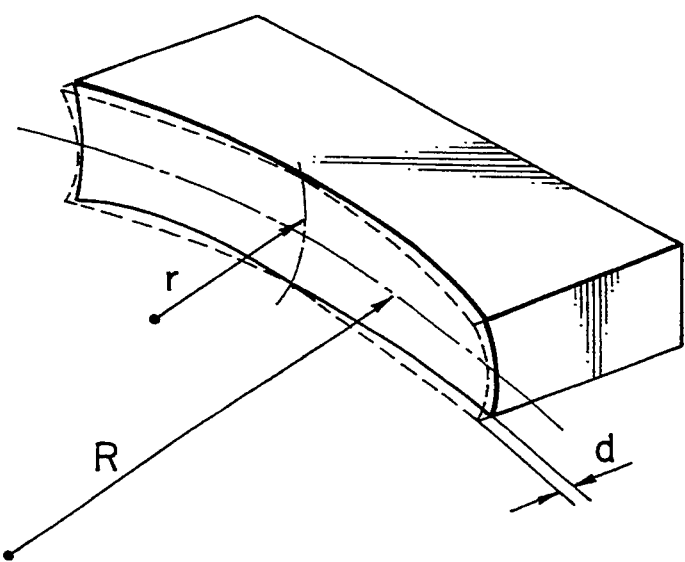
FIG. 5 is a perspective view showing the shape of the axially asymmetrical non-spheric female die.

Next the non-spherical processing will be explained. The grinding wheel 15 is previously moved to the lower extremity of the work 7, which is the starting point of grinding. Here the rotating table 8 is rotated. In the case of the non-spherical working it is necessary that the position of the grinding by the grinding wheel 15 on the surface is detected with a high precision. For this purpose, the rotational angle $\theta$ of the rotating table 8 is measured with a high precision by means of the rotary encoder 9 directly coupled with the rotating shaft of the rotating table 8. On the other hand, the air spindle 16 is forwarded step by step for every turn of the rotating table 8, similarly to the case of processing of a toric surface, to vary the position thereof, i.e. to vary the contact point between the grinding wheel 15 and the workpiece 7. For this purpose, working data previously calculated for every position of the air spindle 16 using the rotational angle $\theta$ as a parameter are stored in a memory of a numerical controller 400. The numerical controller 400 detects the rotation angle $\theta$ of the rotating table 8 and functions to set a displacement amount or distance X and to move the air spindle shaft 17 by $\Phi$ for each rotation of the rotating table 8. The numerical controller 400 provides information for forming a non-spherical concave surface and provides, for example, 12 bit data for each fraction of 0.02 μm of a work surface. The straight forwarding table 10 is continuously controlled by reading-out the working data obtained by calculation, detecting a pulse from the rotary encoder 9, and supplying the working data to the piezo actuator 13 on the basis of this pulse. When the rotating table 8 is rotated by one turn, the air spindle 16 is moved step by step to bring the grinding wheel 15 to a new area of the workpiece 7. At the same time the calculated working data corresponding to that position are read-out from the memory to effect the grinding. This series of operations is repeated. When the grinding wheel 15 has terminated to move to the upper extremity of the workpiece 7, the whole surface of the workpiece 7 has been ground. At this time the ground surface is an axially asymmetrical non-spherical surface, for which the radius r varies (FIG. 5), depending on the position in the direction of the auxiliary axis. In other words, an axially asymmetrical non-spherical surface is a modified toric surface having deviations d from a toric surface.

The working data are numerical control data obtained by calculating a deviation at every point while decomposing the surface of the lens into a lattice for every step of the swing of the air spindle 16 for the radius in the auxiliary direction of the lens and for every pulse of the rotary encoder 9 for the radius in the direction of the principal axis.

Figure 6:
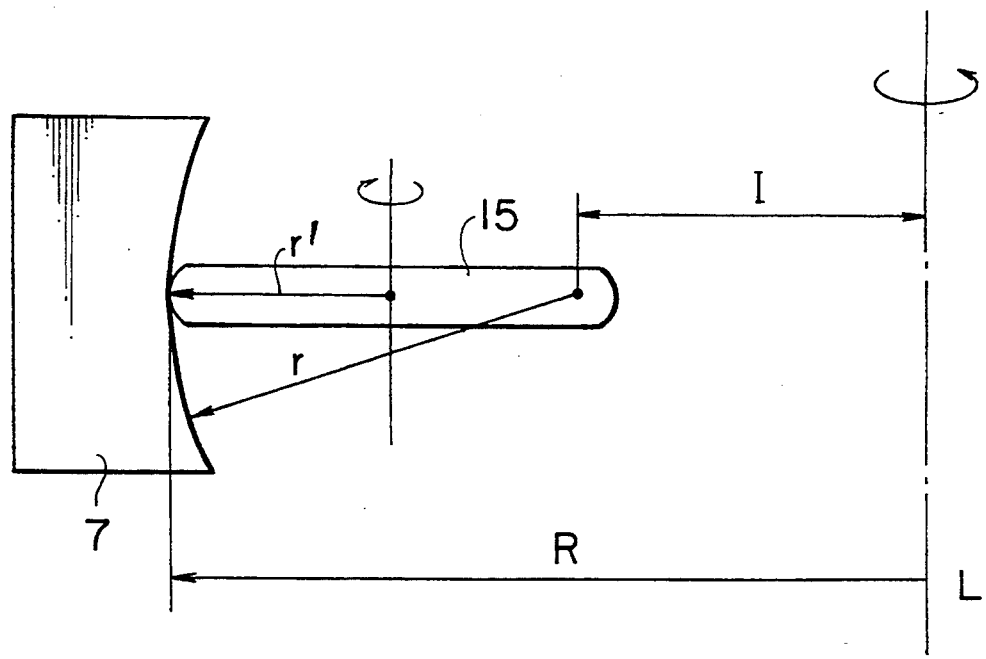
FIG. 6 is a partial enlarged diagram indicating the relation among a grinding wheel, a workpiece, a center of swinging, and a center of rotation.

Further the air spindle 16 can move slightly in a supporting arm 22 so that the distance between the air spindle shaft and the air spindle supporting shaft 17 can be changed. Consequently, even if the radius r' of the grinding wheel 15 in FIG. 6 is decreased by dressing, etc., the relation between the workpiece 7 and the grinding wheel 15 (l=constant) is always fulfilled by locating the rotating table 8, for which $R-r=l$ (constant), at a position distant always by l from the center of rotation, protruding a reference gauge having a length R by using the position as an origin towards the grinding wheel, and moving slightly the air spindle 16 towards the air spindle supporting shaft 17 to bring the grinding wheel 15 into contact with the reference gauge.

According to the embodiment described above, it is possible to fabricate an asymmetrical non-spherical shaped female die glass lens by direct grinding. In order to obtain an asymmetrical non-spherical shaped female die glass lens with a higher precision by direct grinding, embodiments provided with a working force correcting function, a function of preventing rotation oscillation of the rotating table, a function of varying the height of the grinding wheel and a polishing function will be explained one after another.

Figure 7:
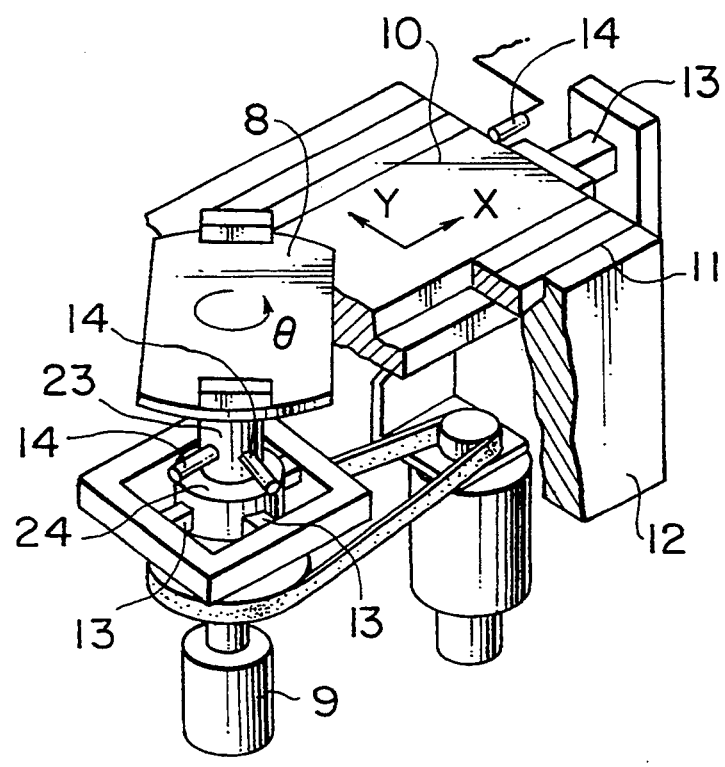
FIG. 7 is a perspective view showing the construction of a mechanism for correcting unintentional oscillation by rotation of a rotating table, which is an embodiment of the present invention.

FIG. 7 shows an embodiment of the device provided with the function of preventing rotation oscillation of the rotating table. The rotating shaft 23 of the rotating table 8 is supported in the directions x and y by the piezo actuators 13 through a rolling bearing 24. The rotation oscillation of the rotating shaft 23 is detected by means of the electro-static capacitance type displacement detectors 14, and a control type circuit mechanism is built-in, which can suppress the rotation oscillation to a small value by moving slightly the rotating shaft held by the rolling bearing 24 by means of the piezo actuators 13.

Figure 8:
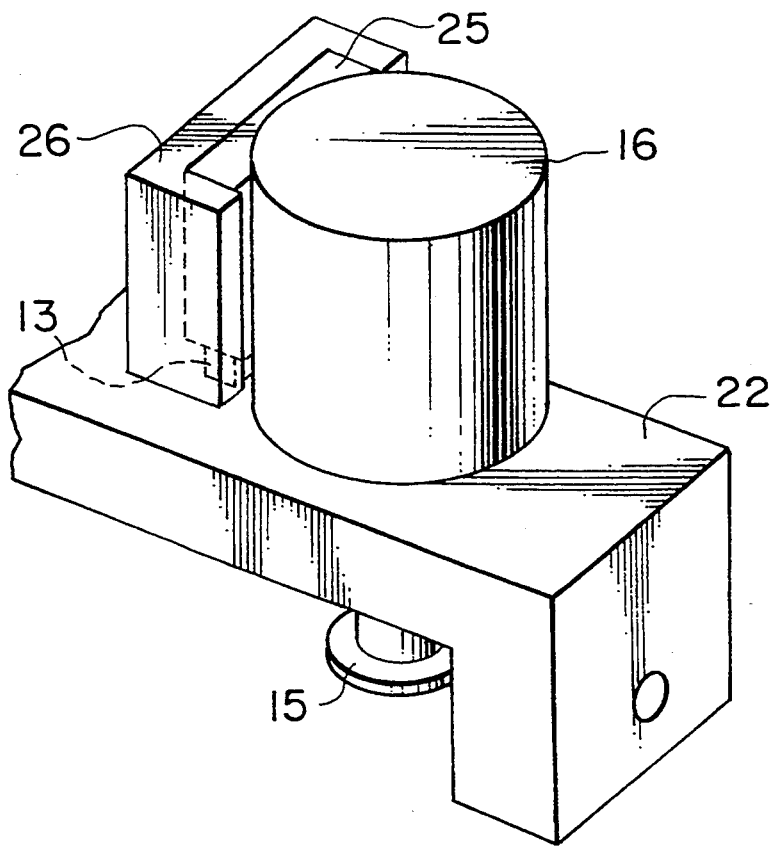
FIG. 8 is a partial enlarged perspective view showing the construction of an air spindle moving mechanism, which is an embodiment of the present invention.
Figure 9:
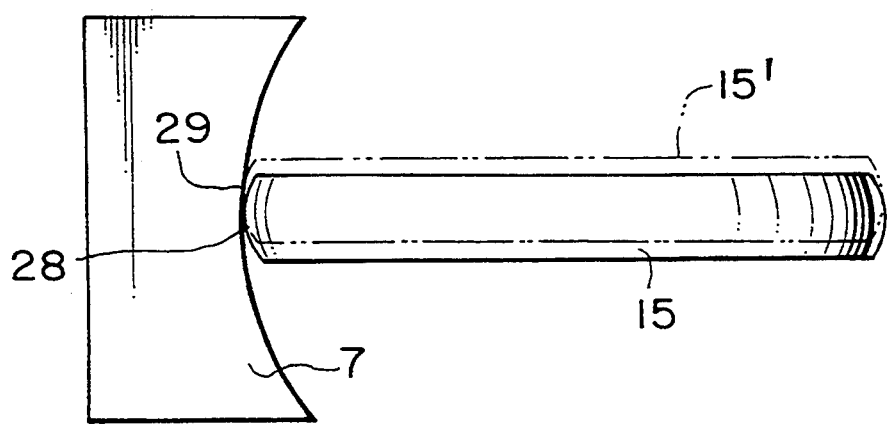
FIG. 9 is a partial enlarged diagram indicating mounting errors at mounting a grinding wheel.

FIG. 8 shows an embodiment of the device provided with the function of varying the height of the grinding wheel. The air spindle 16 for rotating the grinding wheel 15 is disposed on the straight forwarding table 25. This straight forwarding table 25 is mounted on the supporting arm 22 through a guide 26. The straight movement of this straight forwarding table 25 can be finely regulated by means of the piezo actuator 13. As the result, the air spindle 16 can be moved in a direction perpendicular to the mounting surface of the supporting arm 22 and in this way it is possible to regulate the mounting height in the perpendicular direction of the grinding wheel 15 with respect to the workpiece 7. The grinding wheel 15 used in the processing device indicated in the present invention has a convex surface as indicated in FIG. 6. Consequently, when a grinding wheel 15 is replaced by another grinding wheel 15', it is possible that the processing point on the surface of the grinding wheel 15' is changed to another processing point 29, as indicated in FIG. 9, depending on how the grinding wheel 27 is mounted on the air spindle 16. In this state, if the processing were continued in this state, working precision of the workpiece 7 would be remarkably lowered, because the shape of the grinding surface in the auxiliary direction would vary.

Owing to the function of varying the mounting height of the grinding wheel as in the device according to the present invention, it is possible to prevent lowering of the working precision produced upon exchanging the grinding wheel.

Figure 10:
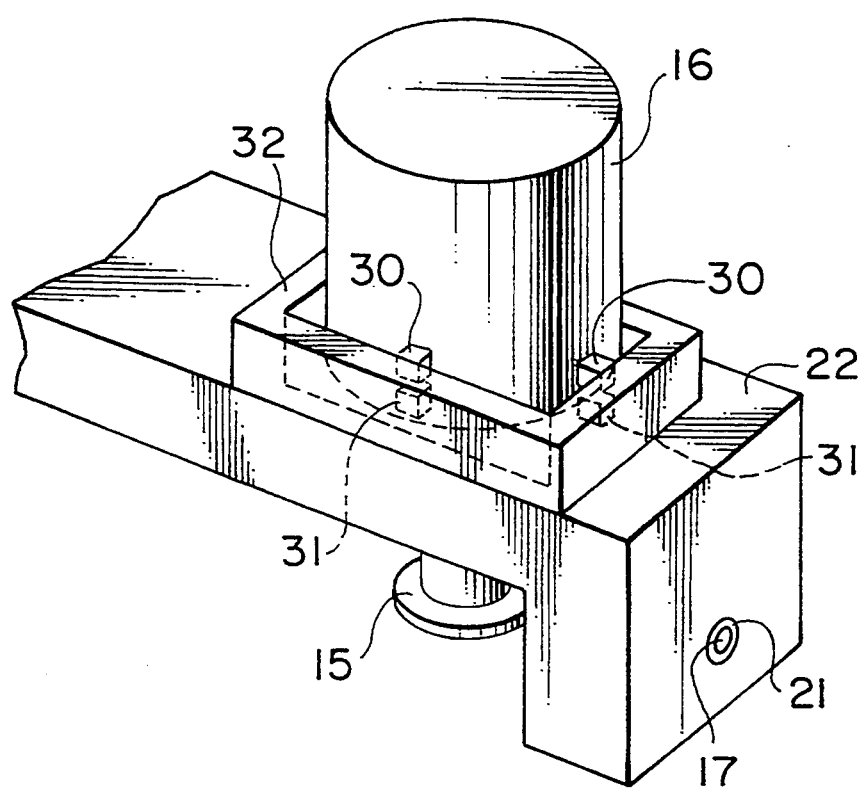
FIG. 10 is a partial enlarged perspective view indicating the construction of a working force controlling mechanism, which is an embodiment of the present invention.
Figure 11:
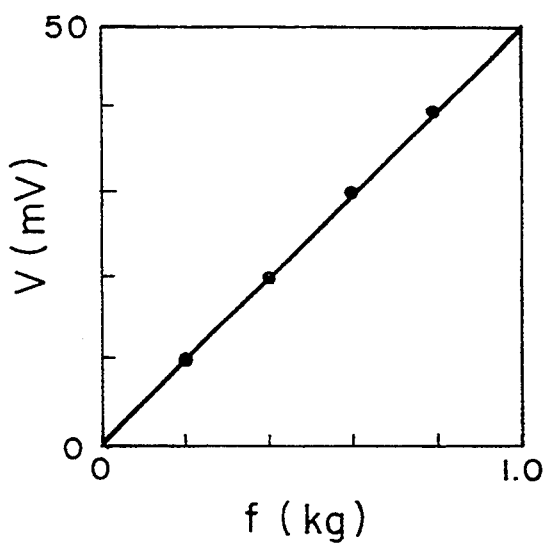
FIG. 11 is a graph indicating the relation between force and generated voltage of a piezo-actuator used for detecting the working force applied by the present invention.

FIG. 10 shows an embodiment of the device provided with the working force correcting function. The air spindle 16 is held by a mounting member 32 from four quarters through piezo actuators 30 for measuring the working force and piezo actuators 31 for controlling the working force. FIG. 11 indicates an example of a result obtained by examining the relation between the force f applied to the piezo actuator 30 for measuring the working force and the generated voltage V. Generally a piezo actuator has a property of generating a voltage by the piezo-electric effect, when a force is applied thereto. As indicated in FIG. 11, there is a linear relationship between the force f applied thereto and the generated voltage V. Therefore, by detecting the generated voltage it is possible to know the force applied to the piezo actuator. The working force f is detected by the piezo actuator 30 for measuring the working force, and the generated voltage V at this time is compared with a working force instructing voltage $V_0$. The piezo actuator 31 for controlling the working force is displaced so that the difference therebetween is 0. As the result, even if the working force varied during grinding, if the working force instructing voltage $V_0$ is kept constant, it is possible to control the working force by grinding so as to be constant. By carrying out the processing while keeping the working force constant, as described above, it is possible to suppress perturbing phenomena such as vibration due to fluctuations in the working force, elastic deformations of the work, etc.

Figure 12:
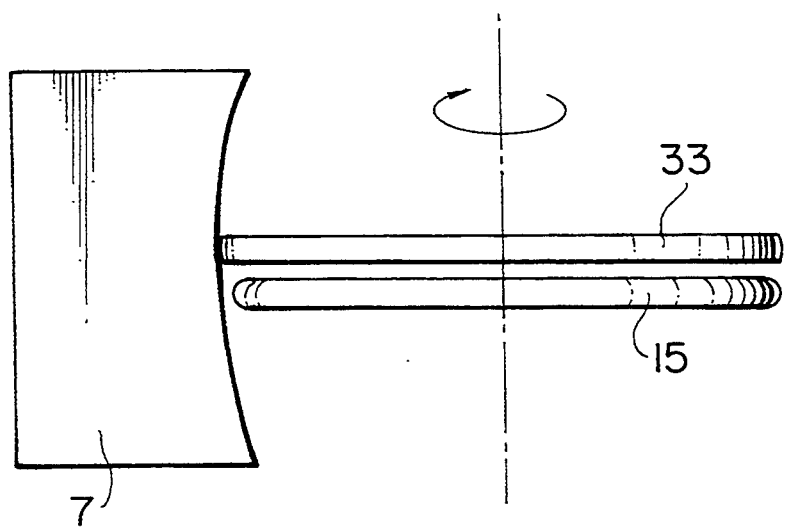
FIG. 12 is a partial enlarged diagram indicating a grinding mechanism, which is an embodiment of the present invention.

FIG. 12 shows an embodiment of the device provided with the polishing function. A polisher 33 is mounted parallel to the grinding wheel 15. The polisher 33 may be made of chemical fiber such as e.g. teflon or soft metallic material such as tin, apart from fibrous material such as felt. Since the device according to the present embodiment is necessarily provided with the function of regulating the mounting height of the grinding wheel, the air spindle 16 is moved in the up- and down-ward direction at the polishing processing, and polishing is effected in a state where the work is brought into contact with the polisher 33. During the polishing processing, polishing fluid containing free grinding wheel particles such as diamond paste is sprinkled on the work instead of grinding fluid. Since the device according to the present embodiment is provided with both the function of generating a non-spherical surface and the function of controlling the working force, it is possible to polish the workpiece 7 without impairing the shape thereof at all.

Figure 14:
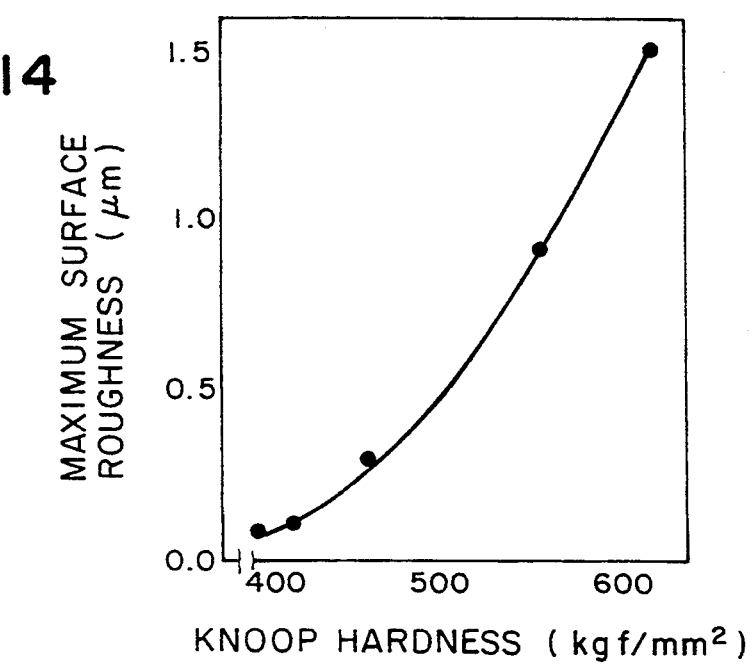
FIG. 14 is a graph indicating the relation between roughness of a surface finished by grinding and hardness of raw material.

Next the glass described above was ground by using a grinding processing device, in which the nozzle portion was fixed, and the aspect of a finished surface was examined. By a prior art grinding processing device, since the nozzle is fixed, supply of grinding fluid to the part to be ground becomes insufficient, as the grinding wheel becomes more distant from the central portion of the work. As the result, grinding defect takes place, and superficial roughness of the finished surface is worsened. FIG. 14 shows results obtained by observing the aspect of the finished surface in the neighborhood of an end. As can be seen from FIG. 14, even if the supply of the grinding fluid is insufficient, if the work is made of a soft material (e.g. LF5; Knoop hardness 445 kg/mm$^2$), a smooth finished surface can be obtained, but if hardness of the material increases (e.g. LAK8; Knoop hardness 750 kg/mm$^2$), it is influenced significantly by the state of the supply of grinding fluid and superficial roughness of the finished surface is worsened.

Figure 15A:
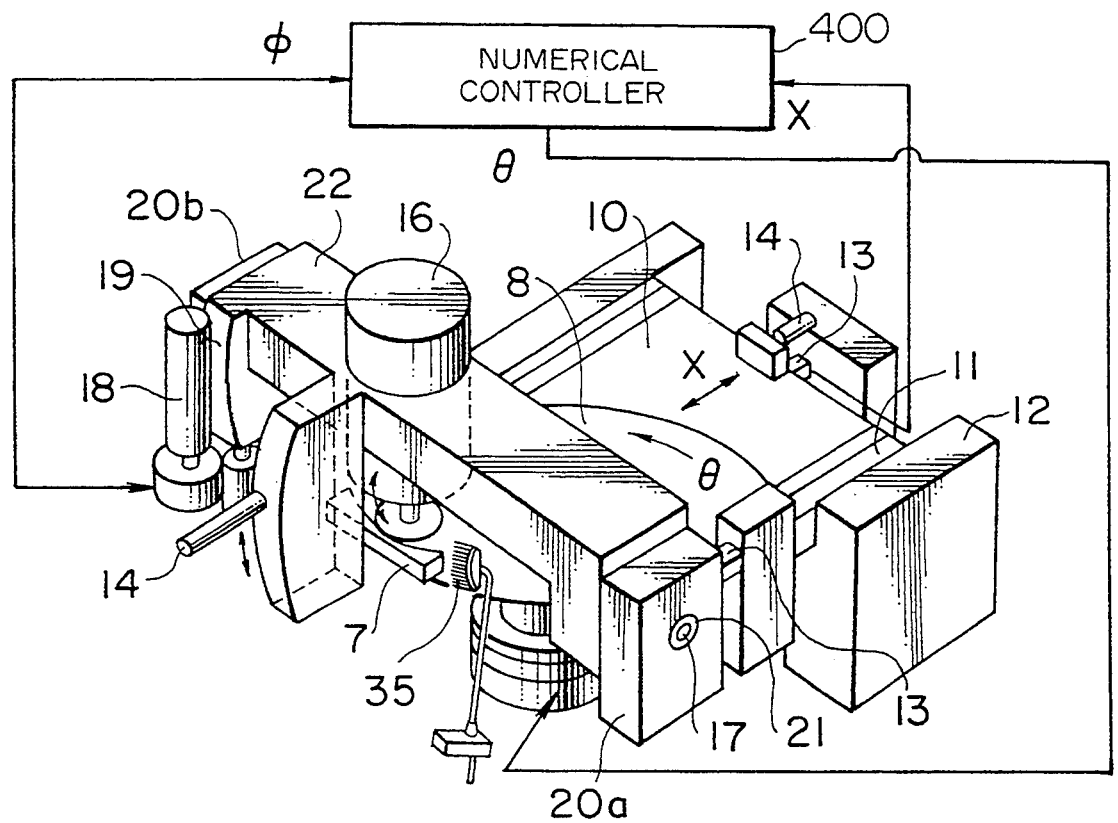
FIGS. 15a and 15b are a perspective view showing the construction of a device for fabricating an axially asymmetrical non-spheric female die, having an ejection control nozzle, and a diagram for explaining operation thereof, respectively, which are an embodiment of the present invention.
Figure 15B:
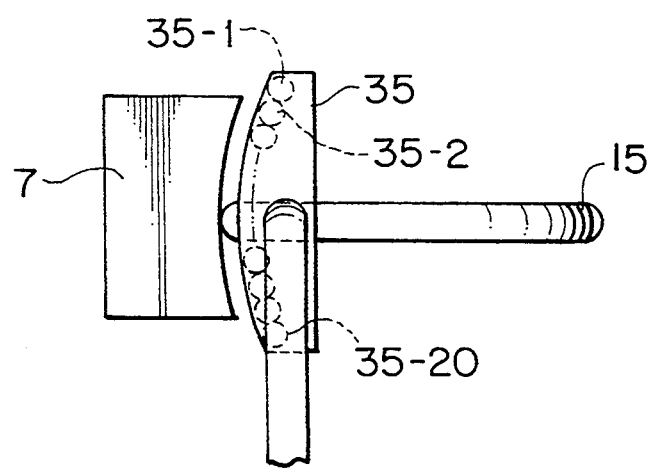
Figure 16:
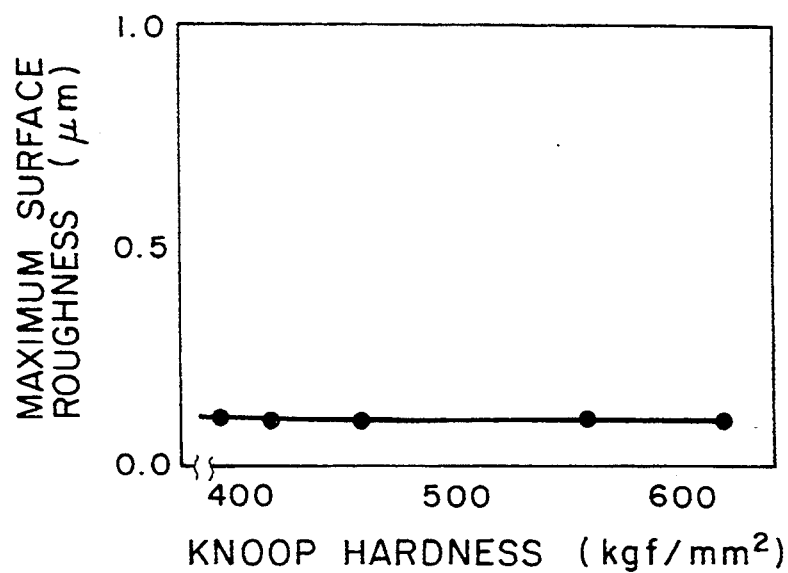
FIG. 16 is another graph indicating the relation between roughness of a surface finished by grinding and hardness of raw material.

FIGS. 15a and 15b show an embodiment for solving this problem. These figures indicate a construction, in which grinding fluid is supplied always in a same state to the grinding point on the workpiece 7 in a processing device for processing an axially asymmetrical non-spherical female die by grinding under NC control. It is provided with grinding fluid supplying means 35 having 20 nozzles (35-1 to 35-20) disposed along a trajectory for the arc-shaped movement of the grinding point, each having an inner diameter of 1.5 mm. As the grinding point moves, different nozzles work. In this way the supply of the grinding fluid to the grinding point is kept always in a same state. FIG. 16 indicates results obtained by grinding by means of this grinding fluid supplying means 35. According to the present embodiment, since grinding fluid is sprinkled sufficiently on any area of the workpiece 7, it is possible to grind even a material hardly ground in a mirror surface.

As another example, in the case where there is disposed no controller for supplying grinding fluid for the purpose of simplifying the installation, the nozzle is formed in a shape identical to that of the trajectory of swinging of the grinding point. In this way, since grinding fluid is ejected along the trajectory of swinging of the grinding point, grinding fluid is always sprinkled uniformly on the grinding point.

Figure 13:
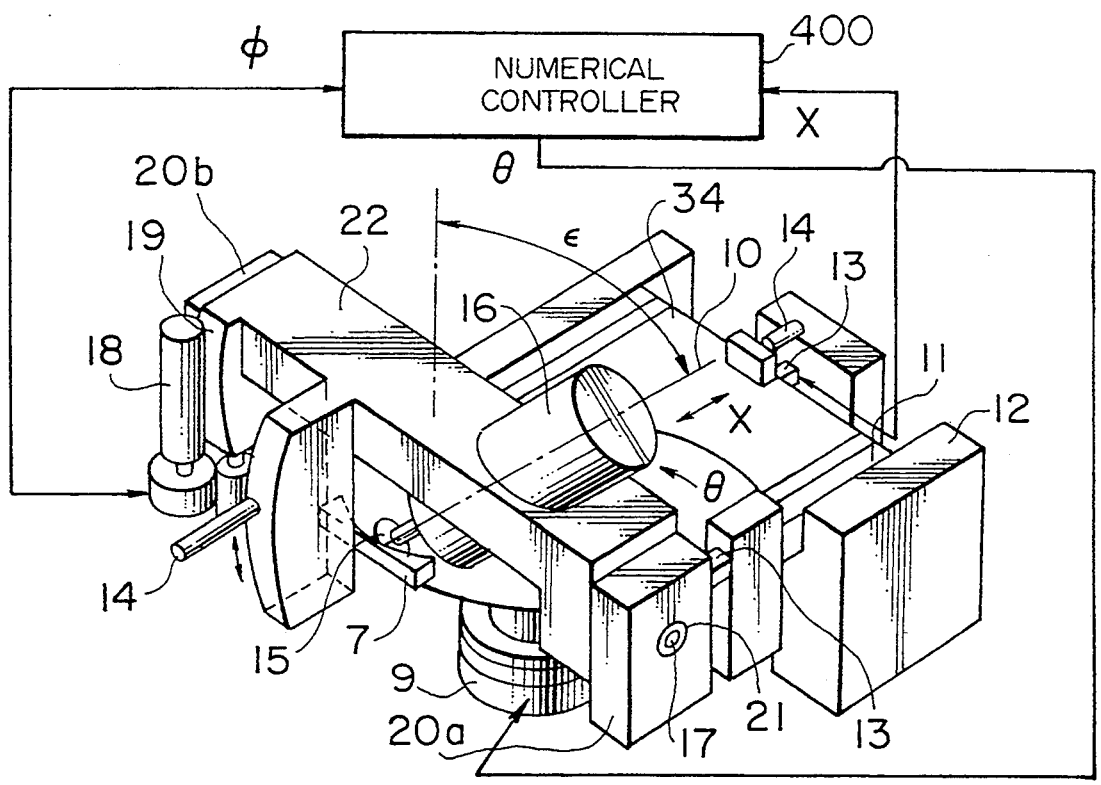
FIG. 13 is a perspective view showing the construction of a device for fabricating an axially asymmetrical non-spheric female die, in the case where a grinding shaft is inclined, which is an embodiment of the present invention.

In the above embodiments, a case where the grinding wheel spindle shaft 34 was perpendicular to the surface of the supporting arm 22 was explained. Now FIG. 13 shows an embodiment, in which the surface roughness of a work is reduced to provide a smoother ground surface. The grinding wheel spindle shaft 34 is set so as to be inclined by an angle $\xi$ with respect to the surface of the supporting arm 22. In this case, since the contact portion between the grinding wheel 15 and the workpiece 7 is increased, the working mark can be reduced.

Figure 1B:
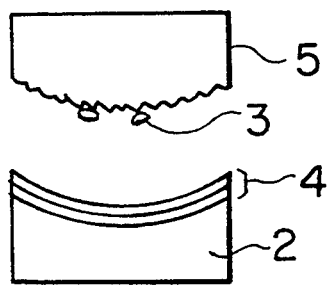
Figure 1C:
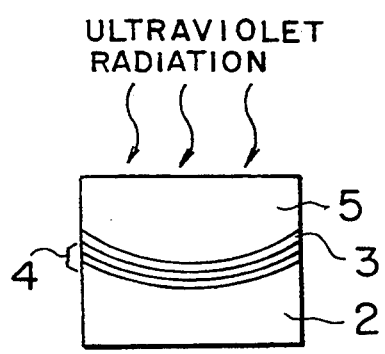
Figure 1D:
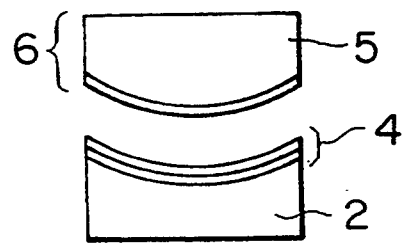

Next FIGS. 1b to 1d show a method, by which the shape of the surface of a female die obtained by any one of the embodiments described above is transcribed on a basic lens (FIG. 1a). As a pre-treatment before the passage to FIG. 1b, a basic lens 5 serving as the base for the hybrid lens is prepared. In order to improve adhesiveness between the ultraviolet hardened resin 3 and the basic lens 5, the basic lens 5 is subjected to a surface treatment similar to that effected at fabricating the female die. For the method for roughening the surface there are known e.g. a method by which a desired superficial roughness is obtained by using grinding wheel particles having a fixed size, a method by which plasma etching is effected, a method by which etching is effected by using hydrofluoric acid, etc. Further, after having applied a release agent to the surface of the female die, in order to improve easiness of releasing the completed hybrid lens 6 from the female die, a suitable amount of ultraviolet hardened resin 3 is dropped on the basic lens 5 serving as the base, as indicated in FIG. 1b.

Next, as indicated in FIG. 1c, after having thrust it against the surface of the die 4, the resin 3 is hardened by irradiating it with ultraviolet ray for about 30 seconds.

Then, as indicated in FIG. 1d, the hybrid lens 6, on which the asymmetrical non-spherical shaped layer is transcribed from the female die, is released from the female die. That is, an ultraviolet hardened resin layer 3 is superposed on the basic lens 5. In this way, a hybrid lens 6 is obtained, in which the axially asymmetrical non-spherical shape is transcribed on the surface of the ultraviolet hardened resin layer with a high precision.

FIGS. 18a to 18e show fabrication steps for a hybrid lens having an SiO protecting film. Lubricating agent made mainly of aside containing fluorine is applied as release agent to the surface of the female die having a non-spherical shape. The film of the release agent is about 100 nm thick, or it may be thicker than that. Next ultraviolet hardened resin 3 is applied uniformly to the surface of the female die 4 and a toric lens 5 made of glass is thrust against it with a constant weight W. Then it is irradiated with ultraviolet ray for several minutes to harden the resin. After having transcribed the non-spherical shape on the surface of the glass lens in this way, the lens 6 is released from the female die 59. Finally a protecting film 37 made of SiO is formed by sputtering on the surface of the non-spherical lens 6. The film thickness at this time is 1 nm. However, if the film thickness is less than about 100 nm, influences thereof on optical characteristics of the lens can be neglected.

Figure 17:
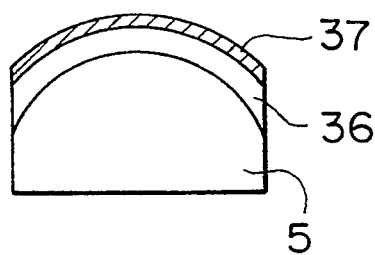
FIG. 17 is a cross-sectional view showing the construction of a lens having a protecting film.
Figure 18A:
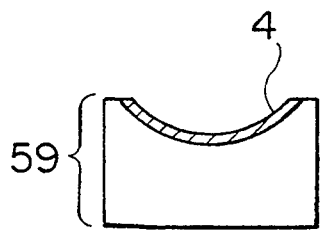
FIGS. 18a to 18e are diagrams for explaining steps for fabricating a lens having a protecting film.
Figure 18B:
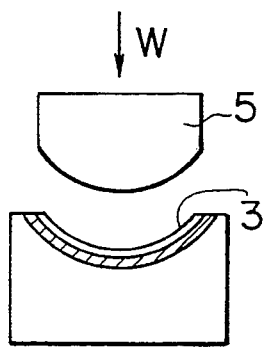
Figure 18C:
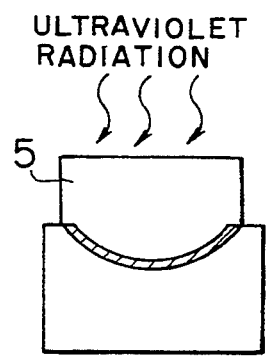
Figure 18D:
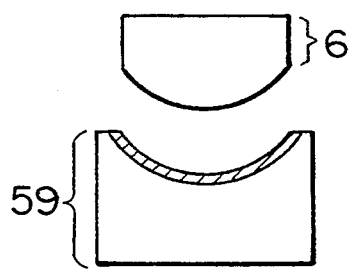
Figure 18E:
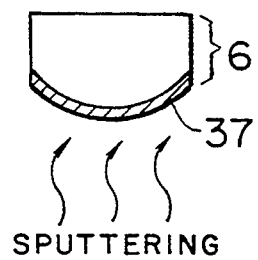

A hybrid lens according to the present invention really fabricated by way of trial, and the waterproofing property and the hydroscopic property thereof were confirmed. FIG. 17 shows an example of the construction of the hybrid lens according to the present invention. In FIG. 17, in order to indicate the shape of the lens so as to be easily understood, various sorts of dimensions such as radius of curvature are emphasized. This lens is a hybrid non-spherical lens, in which a non-spherical surface is formed by superposing an ultraviolet hardened resin layer 36 on the surface of the basic lens 5 having a toric shape, and a protecting film 37 made of SiO is disposed further thereon. This lens was left in an atmosphere of humidity 100% for 100 hours. The water absorbing property was evaluated by measuring variations in the weight thereof, and a water absorption rate of 0% was found. Thus it was possible to realize a very climate-resistant lens. Next the waterproofing property was verified. For the experiment a basic sample was used, in which 200 mg of ultraviolet hardened resin was put on a glass base plate of 50 mm square and hardened. Next, in order to obtain a waterproofing effect, two kinds of samples, in one of which a fluorine containing water repellent treatment agent was applied to the surface of the basic sample and in another of which an SiO protecting film 5 nm thick was formed by sputtering on the surface of the basic sample, were prepared. After having left these samples in an atmosphere of humidity 100% for a long time, the water absorbing property was evaluated by measuring variations in the weight thereof. The duration of leaving them in the atmosphere was 65 and 90 hours. Obtained results are indicated in TABLE 1.

TABLE 1

| SAMPLE | WATER ABSORPTION RATE (%) | | |
| --- | --- | --- | --- |
| BASIC SAMPLE (RESIN ONLY) | 0 | 3.8 | 4.6 |
| RESIN + WATER REPELLENT TREATMENT AGENT | 0 | 3.4 | 4.0 |
| RESIN + SiO$_2$ PROTECTING FILM | 0 | 0 | 0 |
| SAMPLE LEAVING TIME (hours) | 0 | 65 | 90 |

From the results of the experiment it can be seen that when both the basic sample consisting only of resin and the sample in which a fluorine containing water repellent agent is applied to the surface of the resin are left in an atmosphere of high humidity for a long time, water penetrates into the interior of the resin, and on the contrary no water penetration is found for the sample in which the SiO protecting film is formed on the surface of the resin. However surface energy of the sample in which a fluorine containing water repellent agent is applied to the surface of the resin is smaller than that of the basic sample; the water repellent property of the former is better than that of the latter. That is, water drops and dirt are hardly stuck to the surface thereof. Consequently it is an efficient measure for increasing the waterproofing property and the water repellent property to stick the water repellent agent further on the SiO protecting film. As the water repellent agent used here, apart from the fluorine containing water repellent agent, a silicon containing water repellent agent is also useful.

Figure 19:
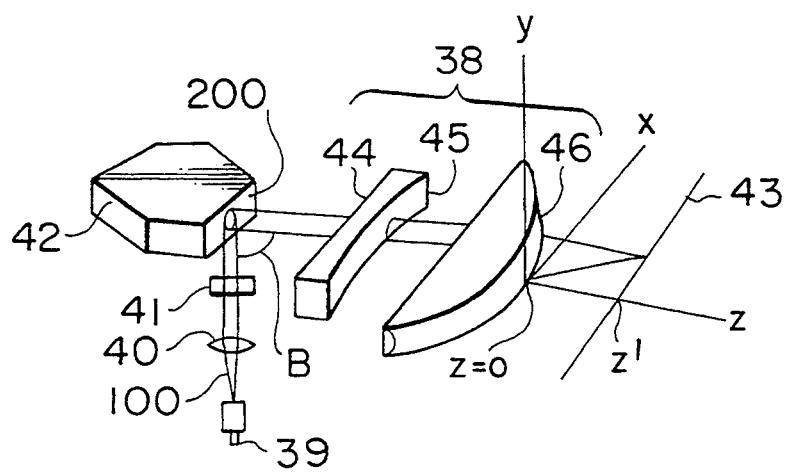
FIG. 19 is a perspective view showing the construction of a principal part of a laser beam printer, which is an embodiment of the present invention.

FIG. 19 is a perspective view showing the construction of the principal part of the laser beam printer, which is another embodiment of the present invention. In FIG. 19, reference numeral 38 is an F$\theta$ lens including a hybrid type scanning lens according to the present invention; 39 is a laser light source; 40 is a collimator lens; 41 is a cylinder lens; 42 is a rotating polygonal mirror; and 43 is a light sensitive drum surface.

A laser light beam 100 emitted by the laser light source 39 passes through the collimator lens 40 to be transformed into a parallel light beam. The cylinder lens 41 is disposed so that it acts only in the auxiliary scanning direction. Here the principal scanning direction is the x direction (direction horizontal to the sheet) and the auxiliary scanning direction is the y direction (direction vertical to the sheet). In this way the optical system is so constructed that the laser beam is converged in the auxiliary scanning direction on the reflecting surface of the rotating polygonal mirror 42. With respect to the auxiliary scanning direction the reflecting surface 200 of the rotating polygonal mirror 42 and the surface of the light sensitive drum 43 are disposed so as to be conjugate with each other from the point of view of geometrical optics.

The scanning lens (F$\theta$) 38 for the scanning with the laser light beam is composed of a first lens having lens surfaces 44 and 45 consisting of spherical or plane surfaces, which are rotation-symmetric with respect to an axis, at the two ends and a second lens (hybrid lens fabricated according to the present invention) having an axially asymmetric non-spherical surface at one end. This scanning lens (F$\theta$ lens) is provided with a function of focusing the parallel light beam on the surface of the light sensitive drum 43, concerning imaging in the principal scanning direction (x direction). In the present embodiment, the radius of the rotating polygonal mirror 42 is 32 mm; the number of plane surfaces is 8; and the incident angle of the incident laser light beam is 66°.

Figure 20:
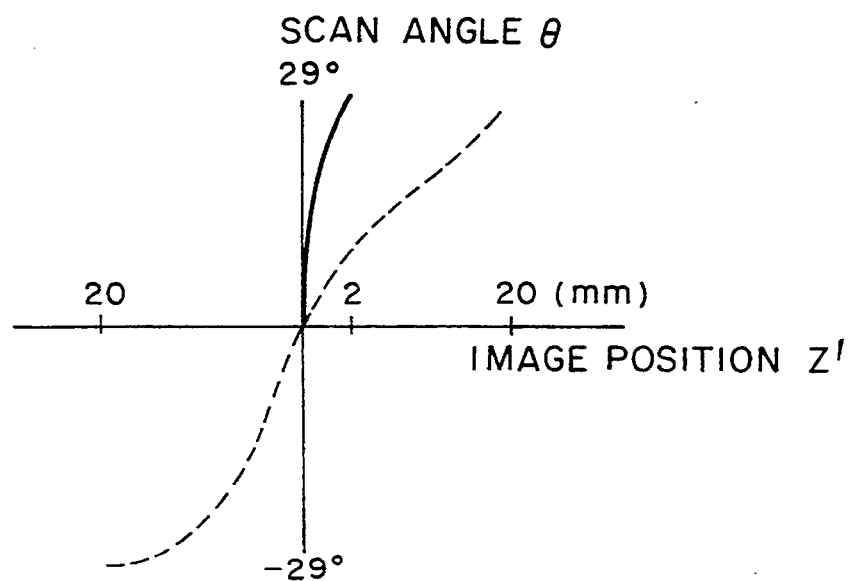
FIG. 20 is a graph indicating imaging characteristics of an F$\theta$ lens.
Figure 21:
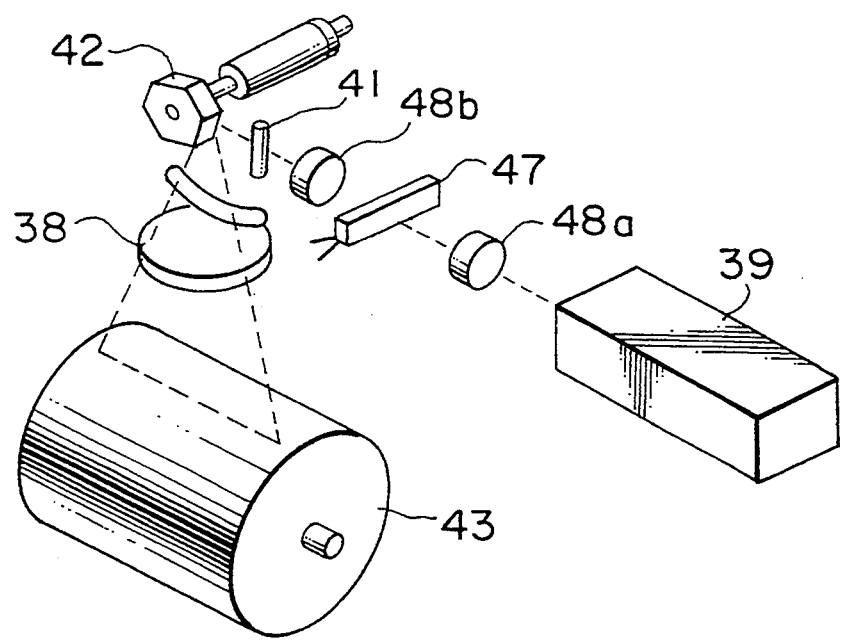
FIG. 21 is a partial perspective view showing the construction of an optical scanning system of a general laser beam printer.
Figure 22:
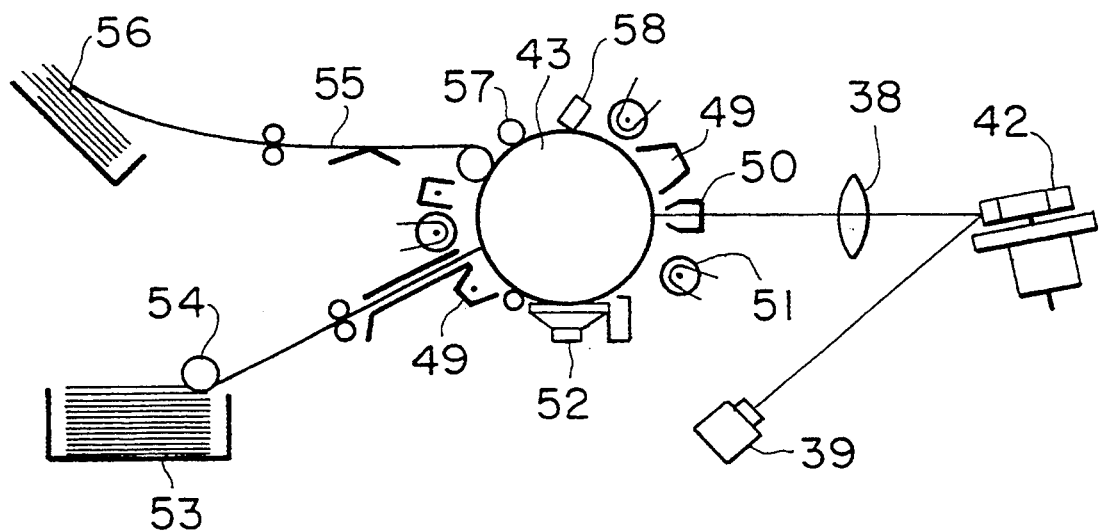
FIG. 22 is a cross-sectional view showing an image forming system of a general laser beam printer.
Figure 23A:
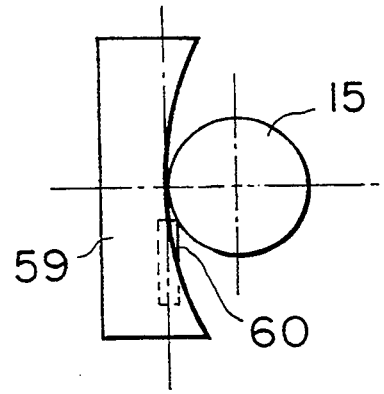
FIGS. 23a and 23b are cross-sectional views indicating the positional relation between a workpiece and a nozzle in a female die fabricating device.
Figure 23B:
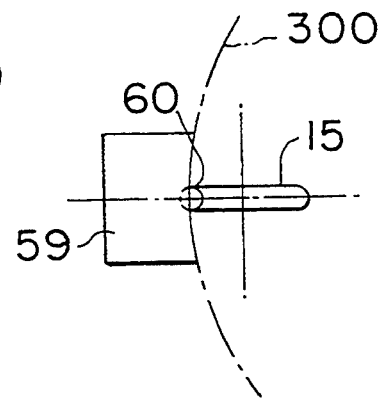
Figure 24A:
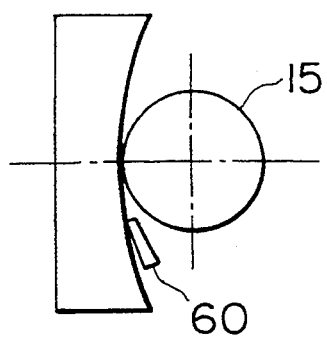
FIGS. 24a and 24b are other cross-sectional views indicating the positional relation between a workpiece and a nozzle in a female die fabricating device.
Figure 24B:
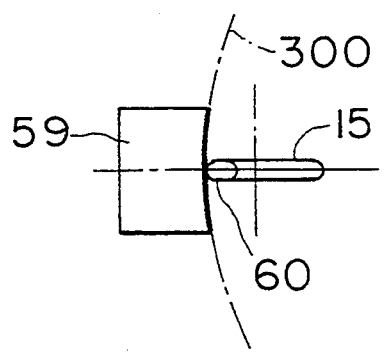
Figure 25A:
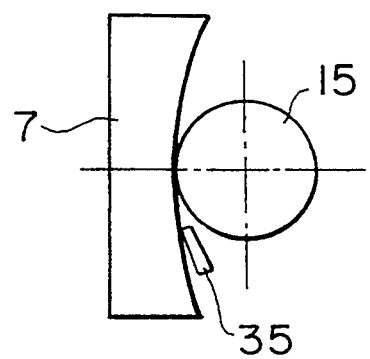
FIGS. 25a and 25b are still other cross-sectional views indicating the positional relation between a workpiece and a nozzle in a female die fabricating device.
Figure 25B:
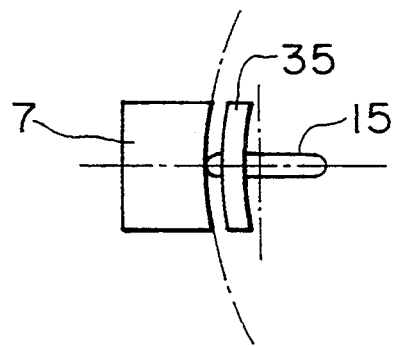

FIG. 20 shows a graph indicating imaging characteristics of the F$\theta$ lens in FIG. 19.

According to the imaging characteristics, when the laser light beam swept by the rotating polygonal mirror 42 indicated in FIG. 19 is focused by the scanning lens (F$\theta$ lens) 38 fabricated according to the present invention, it is possible to keep bending of the imaging surface below 2 mm in a region of scanned image angle of ±29°, as indicated by the full line in FIG. 20. In an experiment it was possible to obtain a uniform focused spot of 60×100 μm. To the contrary, the broken line in FIG. 20 indicates the image position in the auxiliary scanning direction, when no asymmetrical surface shape is given, i.e. when the laser light beam is deflected by a symmetrical cylinder lens to scan the light sensitive drum. As it can be seen from FIG. 20, in the case where no asymmetrical surface shape is given, the bending of the imaging surface is extended to almost 20 mm in a region of scanned image angle of ±29°. From the results described above, it can be understood that the bending of the imaging surface of the laser light beam according to the present invention is very small.

As described above, according to the present invention, it is possible to generate concave surfaces having an axially asymmetrical non-spherical shape with a high precision and with a good mass productivity. By using a processing device according to the present invention it is possible to fabricate a concave surface lens having an axially asymmetrical non-spherical shape by grinding directly a workpiece, if it is made of optical glass. Further, if the workpiece is made of a hard ceramic material, it is possible to fabricate a mold forming female die and thus to fabricate cheap axially asymmetrical non-spherical lenses having excellent optical characteristics by mold formation in mass production. Furthermore, by using an axially asymmetrical non-spherical lens according to the present invention in a laser beam printer, it is possible to effect printing of high quality with a small bending of the image surface. Still further, the axially asymmetrical non-spherical lens according to the present invention can be used as a lens for a laser facsimile, a digital type copier, an image reader, a camera, etc.

We claim:

1. A method of fabricating an axially asymmetrical non-spherical female die to be used for transcribing a shape of an axially asymmetrical non-spherical scanning lens, said method comprising the steps of:

rotating an object to be worked; and at the same time, processing said object to be worked, while moving a grinding wheel spindle shaft serving as a rotation axis of a grinding wheel spindle, with a grinding wheel thereon, along an arc in a plane including a rotation axis of said object to be worked;

wherein said grinding wheel spindle shaft, at its rest position, is substantially parallel with the rotation axis of said object to be worked; said grinding wheel spindle shaft is located between the rotation axis of said object to be worked and said object to be worked; a plane of rotation of said grinding wheel is parallel with a plane of rotation of the object to be worked; and the spatial positional relation between said grinding wheel spindle shaft and said object to be worked varies in accordance with variations in rotational angular position of said object to be worked.

2. A method of fabricating an axially asymmetrical non-spherical female die according to claim 1, wherein the position of the rotation center axis of said object to be worked varies in a direction of a radius of rotation of said object to be worked, corresponding to the rotational angular position.

3. A method of fabricating an axially asymmetrical non-spherical female die according to claim 2, further comprising ejecting grinding fluid from a plurality of grinding fluid ejecting nozzles disposed along a movement trajectory of a grinding point at which said grinding wheel is brought into contact with said object to be worked.

4. A device for fabricating a non-spherical female die comprising:

rotating means for supporting an object to be worked;

a grinding wheel spindle provided with a grinding wheel to work said object to be worked, a rotation axis of said grinding wheel spindle being disposed between said object to be worked and the rotation center of said rotating means, the plane of rotation of said grinding wheel being parallel with the plane of rotation of said rotating means when said grinding wheel spindle shaft is at its rest position;

means for moving the rotation axis of said grinding wheel spindle so that said grinding wheel is moved along an arc in a direction perpendicular to the rotational direction of said object to be worked;

means for detecting the rotation angle of said object to be worked; and means for varying the distance between the rotation axis of said grinding wheel spindle and the rotation center of said rotating means.

5. A device for fabricating a non-spherical female die according to claim 4, further comprising at least one nozzle to eject grinding fluid towards a contacting point between said object to be worked and said grinding wheel, and means for controlling the position where said grinding fluid is ejected.

6. A device for fabricating a non-spherical female die according to claim 4, wherein said means for moving the rotation axis of said grinding wheel spindle includes means for correcting a trajectory of said movement along an arc.

7. A device for fabricating a non-spherical female die according to claim 4, further comprising means for detecting a working force applied by said grinding wheel to said object to be worked; means for moving the position of said grinding wheel; and means for controlling the position of said grinding wheel by means of said position moving means so as to eliminate the difference between a working force signal previously set and a signal from said means for detecting a working force.

8. A device for fabricating a non-spherical female die according to claim 4, further comprising means for detecting rotation oscillation of said rotating means, and means for correcting the rotation oscillation of said rotating means.

9. A device for fabricating a non-spherical female die according to claim 4, further comprising a polisher disposed coaxially with said grinding wheel spindle for polishing said female die.

10. A device for fabricating a non-spherical shaped object comprising:

rotating means for rotating an object to be worked;

a grinding wheel spindle provided with a grinding wheel to work said object to be worked;

means for moving a shaft of said grinding wheel spindle along an arc;

means for detecting a rotation angle of said object to be worked;

means for detecting an angular position of the movement arc of said grinding wheel spindle; and control means responsive to the detected rotation angle and the detected angular position, and to control data received from a memory, for controlling the distance between the rotation axis of said object to be worked and the center axis of the movement arc of said grinding wheel spindle, and for controlling a position at which grinding fluid is ejected, said grinding wheel spindle being disposed between said object to be worked and a rotation center of said rotating means.

* * * * *